July 15, 1958 R. P. VALENTI 2,843,737

SWEEP EXPANDER BIAS CIRCUIT

Filed Sept. 20, 1954

INVENTOR.
RICHARD P. VALENTI
BY Charles H. Brown
ATTORNEY 2,843,737

SWEEP EXPANDER BIAS CIRCUIT

Richard P. Valenti, Brooklyn, N. Y., assignor to Radio Corporation of America, a corporation of Delaware Application September 20, 1954, Serial No. 457,230

5 Claims. (Cl. 250—27)

Figure 1:
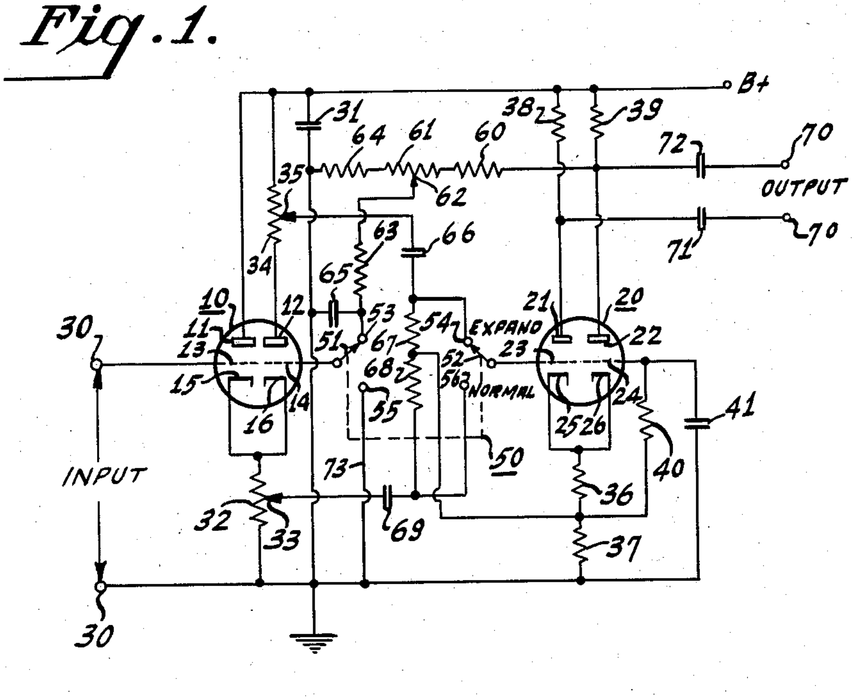

The invention relates to sweep circuits for producing an expanded sawtooth wave, and particularly to a method of and means for centering the expanded portion of a sweep wave under different operating conditions.

When television signals are monitored with a cathode-ray oscilloscope, it may often be necessary or desirable to scrutinize or examine the blanking and synchronizing portions of the television signal with particular care. This may be done by using a sweep voltage wave produced by clipping the upper and lower peaks of the familiar saw-tooth wave. After such clipping, the saw-tooth wave then appears truncated. If, by proper synchronization, the sloping portion of the clipped saw-tooth wave is applied to one set of deflection plates of an oscilloscope at the same time the blanking and synchronizing portions of the television signal are applied to the other set of deflection plates of the oscilloscope, then the blanking and synchronizing portions of the television signal will appear expanded. This permits closer scrutiny of the blanking and synchronizing portions than is otherwise possible with a saw-tooth wave that has not been clipped.

Sweep expander circuits or circuits for producing clipped saw-tooth waves are known in the art. A description of one such circuit utilizing a differential amplifier appears beginning at page 441 of volume 18, entitled "Vacuum Tube Amplifiers," of the Radiation Laboratory Series, First Edition, Third Impression, published by McGraw-Hill Book Co., Inc., in 1948. However, such circuits make no provision to insure that the saw-tooth wave is symmetrically clipped under different operating conditions, such as during changes in frequency or amplitude of the external saw-tooth wave. Thus, the time duration of the upper portion of the clipped saw-tooth wave may differ from the time duration of the lower portion, with the result that the sloping portion of the clipped wave does not appear at the desired time.

Accordingly, it is an object of the invention to provide an improved sweep expander circuit having a bias circuit to provide a symmetrically clipped saw-tooth wave.

Another object is to insure that the center of an expanded waveform always coincides with the center of the saw-tooth waveform.

The circuit of the invention makes use of two differential amplifiers. The first differential amplifier is capable of producing a normal saw-tooth wave in response to an external saw-tooth wave applied to the circuit, or it is capable of producing a clipped saw-tooth wave in response to the same external saw-tooth wave. Switching means are provided for applying the normal or clipped saw-tooth wave, whichever is desired, to an output differential amplifier. To insure that the saw-tooth wave is symmetrically clipped, the switching means also apply a bias voltage, which is derived from the output differential amplifier, back to the first differential amplifier. When the switching means are connected so as to apply the normal saw-tooth wave to the output differential amplifier, no bias voltage is applied to the first differential amplifier.

Figure 2:
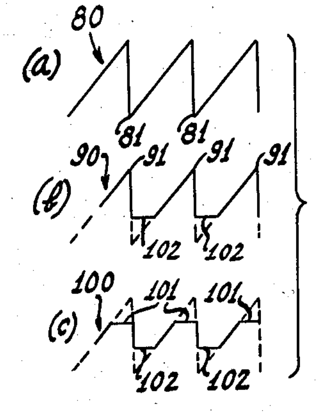
Figure 3:
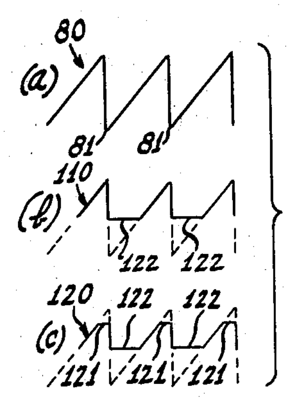
Figure 4:
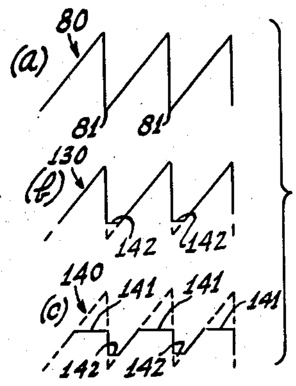

The invention is further explained in the following description, taken with reference to the accompanying drawing, in which:

Fig. 1 shows a sweep expander bias circuit in accordance with the invention; and Figs. 2, 3 and 4 show examples of waveforms for explaining the operation of the circuit of Fig. 1.

The sweep expander bias circuit shown in Fig. 1 utilizes a first differential amplifier 10 and an output differential amplifier 20. Each of these amplifiers has first and second triode electrode structures or sections which may be enclosed in separate evacuated envelopes or in the same envelopes 10, 20 as shown in Fig. 1. A saw-tooth wave is applied to the input terminals 30, one of which is connected to the control grid 13 of the first triode structure of the first differential amplifier 10, and the other terminal is connected to a point of reference potential such as ground. A terminal B+ is provided for applying the positive terminal of a source of D.-C. potential to the anode electrodes of the circuit. A capacitor 31 may be connected between the B+ terminal and the point of reference potential. The cathodes 15, 16 of both triode electrode structures or sections of the first differential amplifier are connected together, and a potentiometer 32 having a variable tap or contact 33 is connected between the cathodes 15, 16 and the point of reference potential. The anode 11 of the first triode electrode structure is connected directly to the B+ terminal, and the anode 12 of the second triode electrode structure is also connected to the B+ terminal through a potentiometer 34 which has a variable tap or contact 35. The cathodes 25, 26 of both triode electrode structures or sections of the output differential amplifier 20 are connected together, and two resistors 36, 37 are serially connected between the cathodes 25, 26 and the point of reference potential. The anodes 21, 22 of the output differential amplifier are connected to the B+ terminal through resistors 38, 39 respectively. A resistor 40 is connected between the control grid 24 of the second triode of the output differential amplifier 20 and the junction of the two cathode resistors 36, 37. The control grid 24 of the output differential amplifier is also connected to the point of reference potential by a capacitor 41.

The two differential amplifiers are coupled together through switching means 50 comprising a double-pole double-throw switch. The blades 51, 52 of the switch are electrically insulated from each other, but are mechanically connected so that they move simultaneously. When the switching means 50 is in the expand position, as shown, the first blade 51 engages its upper contact 53, and the second blade 52 engages its upper contact 54. When the switch is in the normal position, the blades 51, 53 engage their respective lower contacts 55, 56.

The first blade 51 of the switching means 50 is connected to the control grid 14 of the second triode of the first differential amplifier 10. When the switching means 50 is in the expand position, a portion of the output voltage, derived from the anode 22 of the second triode electrode structure of the output differential amplifier 20, is fed back to the control grid 14 through a D.-C. path comprising three serially connected resistors 60, 61, 63. Any A.-C. appearing on the upper contact 53 engaged by the first switch blade 51 is by-passed to the point of reference potential or ground by a capacitor 65, thus filtering the feedback voltage. The resistance of this path may be varied by a centering potentiometer 61 which has a variable tap or contact 62. A resistor 64 is connected between the centering potentiometer 61 and the point of reference potential.

The second blade 52 of the switching means 50 is connected to the control grid 23 of the first triode electrode structure of the output differential amplifier 20. When the switching means 50 is in the expand position, a portion of the voltage across the anode potentiometer 34 of the second triode of the first differential amplifier 10 is applied to the control grid 23 of the first triode of the output differential amplifier 20. This voltage is applied by a capacitor 66 connected between the variable tap or contact 35 of the anode potentiometer 34 and the upper contact 54 engaged by the second switch blade 52.

Two serially connected resistors 67, 68 are connected between the upper and lower contacts 54, 56 engaged by the second switch blade 52. The junction of these two resistors 67, 68 is connected to the junction of the cathode resistors 36, 37 of the output differential amplifier 20.

When the switching means 50 is in the normal position, the blades 51, 52 engage their respective lower contacts 55, 56. In this position, a portion of the voltage derived from the cathode potentiometer 32 is applied to the control grid 23 of the first triode section of the output differential amplifier 20. This voltage is applied by a capacitor 69 connected between the variable tap or contact 33 of the cathode potentiometer 32 and the lower contact 56 engaged by the second switch blade 52. Also in this normal position, the control grid 14 of the second triode section of the first differential amplifier 10 is connected to the point of reference potential by a connection 73 between the point of reference potential and the lower contact 55 engaged by the first switch blade 51. No voltage is fed back from the output differential amplifier to the first differential amplifier when the switching means 50 is in the normal position.

It will thus be seen that for the normal position of the switching means 50, a portion of the voltage across the cathode potentiometer 32 of the first differential amplifier 10 is applied to the output differential amplifier 20. For the expand position of the switching means 50, a portion of the voltage across the anode potentiometer 34 of the second triode section of the first differential amplifier 10 is applied to the output differential amplifier, and a portion of the anode voltage of the second triode section of the output differential amplifier 20 is fed back to bias the second triode section of the first differential amplifier 10. The normal or the expanded output for the expander circuit may be derived from output terminals 70, which are connected to the anodes 21, 22 of the first and second triode sections of the output differential amplifier by capacitors 71, 72. This output may then be applied to one set of the deflection plates of a cathode-ray oscilloscope for viewing television or other signals that are applied to the other set of deflection plates of the oscilloscope. Or, the output may be used in any time base application requiring a normal or expanded sweep voltage wave.

The operation of the circuit shown in Fig. 1 is explained by the waveforms shown in Figs. 2, 3 and 4. The waves shown in Fig. 2 represent the desired conditions attainable with an expander circuit in accordance with the invention, while the waves shown in Figs. 3 and 4 represent undesired conditions that may occur in an expander circuit not utilizing the invention. Fig. 2(*a*) shows an example of a saw-tooth wave 80 that is applied to the input terminals 30 of the expander circuit. Ways of generating such a wave are known in the art. When this wave 80 is applied to the control grid 13 of the first triode section of the first differential amplifier 10, its lower peaks 81 are clipped off by virtue of the cut-off characteristics of the first triode section, and a modified wave 90, shown in Fig. 2(*b*), appears on the cathodes 15, 16 of the first differential amplifier 10. The upper peaks 91 of this modified wave 90 cause the second triode section of the first differential amplifier to cut off, the point at which cut-off occurs being governed by the bias on the control grid 14 of the second triode section. Thus, a wave 100 that has both its upper and lower peaks symmetrically clipped off as shown in Fig. 2(*c*) is produced at the anode 12 of the second tube of the first differential amplifier.

To use the clipped wave 100 for monitoring, it is applied to the output differential amplifier 20, where an output push-pull voltage is produced on the anodes 21, 22 of the output differential amplifier and on the output terminals 70. The wave appearing at the anode 22 of the second triode section of the output differential amplifier 20 has the same shape as the clipped wave 100, and differs only by a scale factor. The clipped wave 100 is applied from the anode 12 to the control grid 23 through a series path comprising the anode potentiometer 34 and variable tap 35, the capacitor 66, the upper contact 54, and the second switch blade 52. The first triode section of the output differential amplifier 20 produces an output voltage on its anode 21 in the normal way, and the second triode section of the output differential amplifier 20 produces an output voltage on its anode 22 from the voltage applied to its cathode 26 from the cathode 25 of the first triode section.

As has already been pointed out, the clipping of the upper peaks 91 of the modified wave 90 depends upon the amount of positive bias on the grid 14 of the second triode section of the first differential amplifier 10. This bias also partially determines the clipping of the lower peaks 81 of the input wave 80, since the cathode bias is determined by the approximately equal cathode currents in both triode sections. The invention provides a circuit for biasing the grid 14 of the second triode section so that the saw-tooth wave is symmetrically clipped. A bias voltage is fed back from the anode 22 of the second triode section of the output differential amplifier 20 to the control grid 14 of the second triode section of the first differential amplifier 10 through a series path comprising the resistor 60, the centering potentiometer 61 and variable contact 62, the resistor 63, the upper contact 53, and the first switch blade 51. This bias voltage is obtained by dividing and filtering the voltage on the anode 22. The D.-C. component, if any is present, of the wave on the anode 22 is fed back to the control grid 14 to change the bias. This change in bias is in a direction to cause the circuit to clip more symmetrically, thus decreasing the D.-C. component of the wave. Consequently when the input saw-tooth wave changes in frequency or amplitude, the bias on the control grid 14 adjusts itself to minimize any asymmetry about the A.-C. axis of the output wave.

The biasing action may be explained by first assuming that the grid 14 is too positive. The cathode current through the second triode section of the first differential amplifier will be higher than normal, thus raising the voltage on the two cathodes 15, 16. The first triode section of the first differential amplifier will be cut off too soon, resulting in a modified wave 110, such as shown in Fig. 3(*b*), appearing at the cathodes 15, 16. The second triode section will be cut off too late, or under the worst conditions not at all, resulting in a clipped wave 120, such as shown in Fig. 3(*c*), appearing at the anode 12. The upper portions 121 are clipped less than the lower portions 122. When such a wave is applied to the control grid 23 of the first triode section of the output differential amplifier, the average current through the first triode is reduced, thus lowering the voltage on the cathode 26 of the second triode of the output differential amplifier, and causing the second triode to conduct more current and thereby lower the voltage on the anode 22. The voltage filtered and fed back to the control grid 14 of the second triode of the first differential amplifier 10 is lowered, thus correcting the bias which was previously too high.

If a bias that is too negative is assumed, the reverse of the previous explanation applies. The voltage on the cathodes 15, 16 is lowered, and the first triode of the first differential amplifier 10 will be cut off too late, resulting in a modified wave 130, such as shown in Fig. 4(*b*). The second triode will be cut off too soon, resulting in a clipped wave 140, such as shown in Fig. 4(*c*), appearing at the anode 12. The upper portions 141 are clipped more than the lower portions 142. When such a wave is applied to the control grid 23, the average current through the first triode is increased, thus raising the voltage on the cathode 26 of the second triode of the output differential amplifier, and causing the second triode to conduct less current and thereby raise the voltage on the anode 22. The voltage filtered and fed back to the control grid 14 is raised, thus correcting the bias which was previously too low.

The amount of the voltage fed back may be varied by the potentiometer 61. When the potentiometer 61 is properly adjusted, the bias on the control grid 14 of the second triode of the first differential amplifier maintains a symmetrically clipped wave despite changes in the frequency and amplitude of the applied external saw-tooth wave.

Should an unclipped saw-tooth wave be desired, the switching means 50 is put in the normal position. When the switching means is in the normal position, the control grid 14 of the second triode of the first differential amplifier 10 is connected to the point of reference potential, thus cutting off the second triode. When the second triode is cut off, the voltage on the cathodes 15, 16 is lowered sufficiently so that no clipping occurs in the first triode. Thus a normal or unclipped saw-tooth voltage wave appears on the cathode 15. This voltage is applied to the control grid 23 of the first triode of the output differential amplifier through the cathode potentiometer 32 and contact 33, the capacitor 69, the lower contact 56 and the second switch blade 52. The output differential amplifier 20 produces the normal push-pull saw-tooth wave which appears on the output terminals 70.

The invention claimed is:

1. A sweep voltage expander circuit for alternatively producing a normal or a clipped sweep voltage wave in response to an external sweep voltage wave applied to said expander circuit, comprising a first differential amplifier, means connected to said first differential amplifier for applying said external sweep voltage thereto, means connected to said first differential amplifier for deriving said normal sweep voltage wave therefrom, means connected to said first differential amplifier for deriving said clipped sweep voltage wave therefrom, an output differential amplifier, switching means for alternatively applying said normal sweep voltage wave derived from said first differential amplifier to said output differential amplifier or applying said clipped sweep voltage wave derived from said first differential amplifier to said output differential amplifier, and means cooperating with said switching means for applying a bias voltage proportional to the output voltage of said output differential amplifier to said first differential amplifier when said clipped sweep voltage wave is applied to said output differential amplifier.

2. In a sweep voltage expander circuit for producing a clipped sweep voltage wave in response to an external sweep voltage wave applied to said expander circuit, the combination of a first differential amplifier, means connected to said first differential amplifier for applying said external sweep voltage wave thereto, an output differential amplifier, means connected to said first differential amplifier for deriving a clipped sweep voltage wave therefrom and applying said derived clipped wave to said output differential amplifier, and means connected between said output differential amplifier and said first differential amplifier for applying a bias voltage proportional to the output voltage of said output differential amplifier to said first differential amplifier.

3. A sweep voltage expander circuit for alternatively producing a normal or a clipped sweep voltage wave in response to an external sweep voltage wave applied to an input terminal of said expander circuit, comprising a first differential amplifier having first and second evacuated electrode structures, each of said structures having at least an anode, a cathode, and a control grid, means connecting said input terminal to said control grid of said first structure for applying said external sweep voltage wave thereto, a first cathode resistor having one end connected to both of said cathodes of said first and second electrode structures and the other end connected to a point of reference potential, an output differential amplifier having first and second electrode structures, each including at least an anode, a cathode, and a control grid, a second cathode resistor having one end connected to both cathodes of said output differential amplifier and the other end connected to said point of reference potential, and switching means having a normal and an expand position for selecting said normal or said clipped sweep voltage wave, said switching means in said normal position connecting said cathodes of said first differential amplifier to said control grid of said first structure of said output differential amplifier and connecting said control grid of said second structure of said first differential amplifier to said point of reference potential, and in said expand position capacitively coupling said anode of said second structure of said first differential amplifier and said control grid of said first structure of said output differential amplifier and connecting a variable resistor between said anode of said second structure of said output differential amplifier and said control grid of said second structure of said first differential amplifier for biasing said second structure of said first differential amplifier.

4. In a cathode-ray oscilloscope having two pairs of deflection plates, a sweep voltage expander circuit for alternatively producing a normal or a clipped sweep voltage wave in response to an external sweep voltage wave applied to an input terminal of said expander circuit, comprising a first differential amplifier having first and second evacuated electrode structures, each including at least an anode, a cathode, and a control grid, means connecting said input terminal to said control grid of said first structure for applying said external sweep voltage wave thereto, a first cathode resistor having one end connected to both of said cathodes of said first and second structures and the other end connected to a point of reference potential, an output differential amplifier having first and second evacuated electrode structures, each including at least an anode, a cathode, and a control grid, a second cathode resistor having one end connected to both of said cathodes of said output differential amplifier and the other end connected to said point of reference potential, switching means having a normal and an expand position for selecting said normal or said clipped sweep voltage wave, said switching means comprising means for capacitively coupling said cathodes of said first differential amplifier to said control grid of said first structure of said output differential amplifier and for connecting said control grid of said second structure of said first differential amplifier to said point of reference potential when in said normal position, and comprising means for capacitively coupling said anode of said second structure of said first differential amplifier to said control grid of said first structure of said output differential amplifier and for connecting a variable resistor between said anode of said second structure of said output differential amplifier and said control grid of said second structure of said first differential amplifier for biasing said second structure of said first differential amplifier when in said expand position, and means for connecting said anodes of said output differential amplifier to one pair of said deflection plates to provide a time base for said cathode-ray oscilloscope.

5. A sweep voltage expander circuit for alternatively producing a normal or a clipped sweep voltage wave in response to an external sweep voltage wave applied to an input terminal of said expander circuit, comprising a first amplifier having first and second evacuated electrode structures, each of said structures having at least an anode, a cathode, and a control grid, means connecting said input terminal to said control grid of said first structure for applying said external sweep voltage wave thereto, a first cathode resistor having one end connected to both of said cathodes of said first and second electrode structures and the other end connected to a point of reference potential, an output amplifier having first and second electrode structures, each including at least an anode, a cathode, and a control grid, a second cathode resistor having one end connected to both cathodes of said output amplifier and the other end connected to said point of reference potential, and switching means having a normal and an expand position for selecting said normal or said clipped sweep voltage wave, said switching means comprising means for coupling said cathodes of said first amplifier to said control grid of said first structure of said output amplifier and for coupling said control grid of said second structure of said first amplifier to said point of reference potential when in said normal position, and further comprising means for coupling said anode of said second structure of said first amplifier to said control grid of said first structure of said output amplifier and for coupling said anode of said second structure of said output amplifier to said control grid of said second structure of said first amplifier when in said expand position for biasing said first amplifier.

References Cited in the file of this patent

UNITED STATES PATENTS

| | | |
|---|---|---|
| 2,276,565 | Crosby | Mar. 17, 1942 |
| 2,299,945 | Wendt | Oct. 27, 1942 |
| 2,362,503 | Scott | Nov. 14, 1944 |
| 2,620,400 | Snijders | Dec. 2, 1952 |
| 2,640,883 | Buchner | June 2, 1953 |